（12） United States Patent
Xu et al.

(10) Patent No.: US 12,193,011 B2
(45) Date of Patent: Jan. 7, 2025

(54) REPEAT TRANSMISSION METHOD AND APPARATUS, CHIP AND COMPUTER PROGRAM

(71) Applicant: GUANGDONG OPPO MOBILE TELECOMMUNICATIONS CORP., LTD., Guangdong (CN)

(72) Inventors: Jing Xu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 482 days.

(21) Appl. No.: 17/341,128

(22) Filed: Jun. 7, 2021

(65) Prior Publication Data

US 2021/0337521 A1 Oct. 28, 2021

Related U.S. Application Data

(63) Continuation of application No. PCT/CN2018/124211, filed on Dec. 27, 2018.

(51) Int. Cl.
*H04W 72/23* (2023.01)
*H04L 1/08* (2006.01)
*H04W 72/0446* (2023.01)

(52) U.S. Cl.
CPC ............... *H04W 72/23* (2023.01); *H04L 1/08* (2013.01); *H04W 72/0446* (2013.01)

(58) Field of Classification Search
CPC .... H04W 72/23; H04W 72/0446; H04L 1/08; H04L 1/0025; H04L 1/0003; H04L 1/0009

(Continued)

(56) References Cited

U.S. PATENT DOCUMENTS

2018/0049164 A1 2/2018 Wu et al.
2019/0053211 A1* 2/2019 Ying ................... H04W 72/044
(Continued)

FOREIGN PATENT DOCUMENTS

| CN | 101541018 A | 9/2009 |
|---|---|---|
| CN | 104811262 A | 7/2015 |
| CN | 107872896 A | 4/2018 |

OTHER PUBLICATIONS

International Search Report issued Aug. 27, 2019 of PCT/CN2018/124211 (4 pages).

(Continued)

*Primary Examiner* — Kwang B Yao
*Assistant Examiner* — Syed M Bokhari
(74) *Attorney, Agent, or Firm* — PERKINS COIE LLP

(57) ABSTRACT

A method for repetition transmission and apparatus, a chip and a computer program are provided. The method includes: transmitting information about a number of repetitions to a terminal through a repetition field in Physical Downlink Shared Channel-time domain resource allocation (PDSCH-TimeDomainResourceAllocation) and/or Physical Uplink Shared Channel-time domain resource allocation (PUSCH-TimeDomainResourceAllocation); reusing a time domain resource assignment indication field of downlink control information to indicate repetition information, wherein the repetition information is configured to indicate a terminal device to perform transmission according to the repetition information.

16 Claims, 3 Drawing Sheets

(58) Field of Classification Search
USPC .......................................................... 370/366
See application file for complete search history.

(56) References Cited

U.S. PATENT DOCUMENTS

| | | | | |
|---|---|---|---|---|
| 2019/0363843 | A1* | 11/2019 | Gordaychik | H04L 1/08 |
| 2020/0022144 | A1* | 1/2020 | Papasakellariou | H04W 72/23 |
| 2020/0136770 | A1* | 4/2020 | Khoshnevisan | H04L 5/0094 |
| 2020/0146032 | A1* | 5/2020 | Bae | H04L 1/1819 |
| 2020/0267756 | A1* | 8/2020 | Fakoorian | H04W 56/001 |
| 2021/0377999 | A1* | 12/2021 | Yang | H04L 1/1819 |
| 2022/0039136 | A1* | 2/2022 | Takeda | H04L 1/08 |
| 2022/0255647 | A1* | 8/2022 | Sahraei | H04L 5/0048 |
| 2022/0386361 | A1* | 12/2022 | Takahashi | H04L 1/189 |

OTHER PUBLICATIONS

Qiu, Gang et al., "NB-1oT (Non-official translation: Research on NB-IoT System Resource Scheduling)" (ZTE Technology Journal), vol. 23, No. 1, Feb. 28, 2017 (Feb. 28, 2017), ISSN: 1009-6868 (14 pages).

* cited by examiner

REPEAT TRANSMISSION METHOD AND APPARATUS, CHIP AND COMPUTER PROGRAM

CROSS-REFERENCE TO RELATED APPLICATION

This application is a continuation application of International application No. PCT/CN2018/124211 filed on Dec. 27, 2018, of which the entire disclosure is hereby incorporated by reference.

TECHNICAL FIELD

The present disclosure relates to a wireless network technology, in particular to a method and apparatus for repetition transmission, a chip and a computer program.

BACKGROUND

The current 5G New Radio (NR) system introduces technologies of slot aggregation and repetition to solve problems of system coverage and reliable data transmission.

At present, the slot aggregation and repetition are semi-statically configured. However, in some scenarios, it is needed to dynamically configure the repetition, but there is no effective solution to dynamically indicate the repetition.

SUMMARY

In view of this, implementations of the present disclosure provide a method, an apparatus, a chip and a computer program for repetition transmission.

In a first aspect, a method for repetition transmission is provided, which includes: reusing a predetermined indication field of downlink control information to indicate repetition information, wherein the repetition information is used for indicating a terminal device to perform transmission according to the repetition information.

In a second aspect, a method for repetition transmission is provided, which includes: acquiring, by a terminal device, repetition information, wherein the repetition information is information indicated through reusing a predetermined indication field of downlink control information by a network side; and performing, by the terminal device, transmission according to the repetition information.

In a third aspect, an apparatus for repetition transmission is provided, which is configured to perform the method in the above first aspect or various implementations thereof.

Specifically, the apparatus for repetition transmission includes functional modules for executing the method in the above first aspect or various implementations thereof.

In a fourth aspect, an apparatus for repetition transmission is provided, which is configured to perform the method in the above second aspect or various implementations thereof.

Specifically, the apparatus for repetition transmission includes functional modules for executing the method in the above second aspect or various implementations thereof.

In a fifth aspect, a communication device is provided, which includes a processor and a memory, wherein the memory is configured to store a computer program, and the processor is configured to call and run the computer program stored in the memory to perform the method in any one of the above first to second aspects or various implementations thereof.

In a sixth aspect, a chip is provided, which is used for implementing the method in any one of the above first aspect to second aspect or various implementations thereof.

Specifically, the chip includes a processor used for calling and running a computer program from a memory, to enable a device in which the chip is installed to perform the method in any one of the first aspect and the second aspect described above or various implementations thereof.

In a seventh aspect, a computer readable storage medium is provided, which is configured to store a computer program, wherein when the computer program is run on a computer, the computer is enabled to perform the method in any one of the above first aspect to second aspect or various implementations thereof.

In an eighth aspect, a computer program product is provided, which includes computer program instructions, wherein when the computer program instructions are executed by a computer, the computer is enabled to perform the method in any one of the above first aspect to second aspect or various implementations thereof.

In a ninth aspect, a computer program is provided, wherein when the computer is run on a computer, the computer is enabled to perform the method in any one of the above first aspect to second aspect or various implementations thereof.

DETAILED DESCRIPTION

Technical solutions in implementations of the present disclosure will be described below with reference to the drawings in the implementations of the present disclosure. It is apparent that the implementations described are just some of the implementations of the present disclosure, but not all of the implementations of the present disclosure. According to the implementations of the present disclosure, all other implementations achieved by a person of ordinary skill in the art without making inventive efforts are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, or a 5G system, etc.

Figure 1:
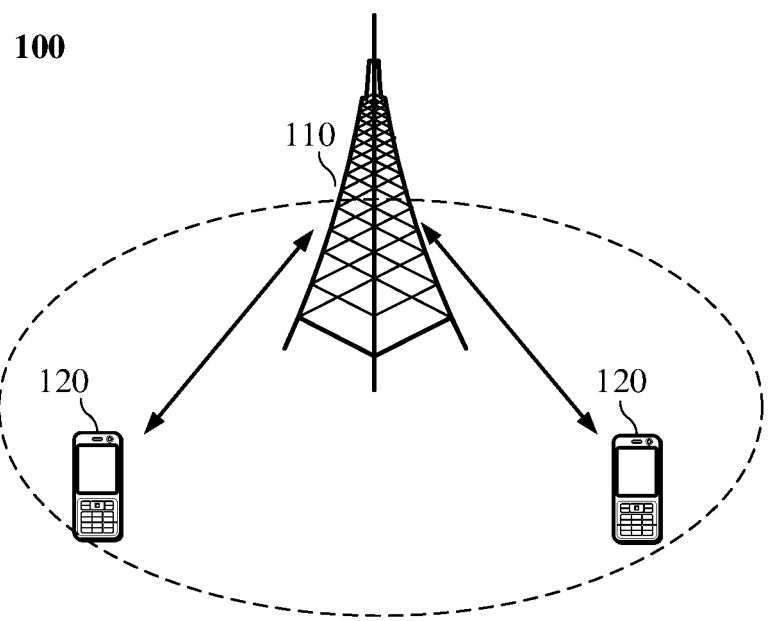
FIG. 1 is a schematic diagram of an architecture of a communication system according to an implementation of the present disclosure.

Illustratively, FIG. 1 is a schematic diagram of architecture of a communication system according to an implementation of the present disclosure. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a network device in a 5G network or a future evolved Public Land Mobile Network (PLMN), etc.

The communication system 100 also includes at least one terminal device 120 located within the coverage area of the network device 110. As used herein, the term "terminal device" includes, but is not limited to, an apparatus configured to receive/send a communication signal via a wired line connection, for example, via Public Switched Telephone Networks (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a DVB-H network, a satellite network, or an AM-FM broadcast sender; and/or another terminal device; and/or an Internet of Things (IoT) device. A terminal device configured to communicate via a wireless interface may be referred to as "a wireless communication terminal", "a wireless terminal" or "a mobile terminal". Examples of the mobile terminal include, but not limited to, a satellite or cellular telephone, a Personal Communications System (PCS) terminal which may combine a cellular radio telephone and data processing, faxing, and data communication abilities, a PDA that may include a radio telephone, a pager, an Internet/intranet access, a Web browser, a memo pad, a calendar, and/or a Global Positioning System (GPS) receiver, and a conventional laptop and/or palmtop receiver or other electronic apparatus including a radio telephone transceiver.

The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing device connected to a wireless modem, a vehicle-mounted device, a wearable device, a terminal device in a 5G network, or a terminal device in a future evolved PLMN, or the like.

Optionally, Device to Device (D2D) communication may be performed between the terminal devices 120.

Optionally, a 5G system or a 5G network may also be called an NR system or an NR network.

The technical solutions of the implementations of the present disclosure may be applied to an unlicensed spectrum or a licensed spectrum, which is not limited in the implementations of the present disclosure.

FIG. 1 schematically illustrates one network device and two terminal devices. Optionally, the wireless communication system 100 may include multiple network devices, and other quantities of terminal devices may be included within a coverage area of each network device, which are not limited in the implementations of the present disclosure.

Optionally, the communication system 100 may include other network entities, such as a network controller and a mobile management entity, which are not limited in the implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, which will not be described here again. The communication device may also include other devices in the communication system 100, such as a network controller, a mobile management entity, and other network entities, which are not limited in the implementations of the present disclosure.

It should be understood that the terms "system" and "network" are often used interchangeably in the document. The term "and/or" in the document is merely an association relationship describing associated objects, indicating that there may be three relationships, for example, A and/or B may indicate three cases: A alone, A and B, and B alone. In addition, the symbol "/" in the document generally indicates that objects before and after the symbol "/" have an "or" relationship.

The present disclosure discloses a repetition transmission method, the repetition may refer to a repetition or an Aggregation Factor, etc. The solution of the present disclosure will be described below by taking repetition as an example.

In actual applications, in some scenarios, dynamic configuration of repetition is required, for example, including but not limited to the following scenarios.

Scenario one: for a terminal device that supports both enhanced Mobile Broadband (eMBB) and Ultra Reliable Low Latency Communication (URLLC) services, as reliability requirements of the two services are different and arrivals of the two services are dynamic, the repetition is preferably dynamically configured to adapt transmission requirements of the two services.

Scenario two: the repetition may also realize cross-slot transmission of a same Transport Block (TB), but cross-slot transmission does not always occur, so the repetition also needs to be dynamically configured.

It can be seen that dynamic repetition transmission is beneficial to adapting transmission requirements of different services or services at different time.

In the scenario one, for a user with a good channel quality, although numbers of symbols required by the eMMB service and the URLLC service are different, different services may be adapted by reasonably configuring lengths of time domain resources. According to different reliability requirements of different services, the URLLC service may be configured with more symbols, such as 7 symbols, and the eMMB service may be configured with fewer symbols, such as 4 symbols. For a user with a poor channel quality, even for the eMMB service needing fewer symbols, it is usually needed to configure 14 symbols, and for the URLLC service, it is usually needed to configure multiple slots, that is, reliability of the URLLC service can be ensured only when a number of repetitions is greater than one.

In the Scenario two, a possibility of cross-slot transmission is greater for transmission with more time domain symbols, so a requirement on dynamic configuration of repetition is higher, while a possibility of cross-slot transmission is less for transmission with fewer time domain symbols, so the requirement on dynamic configuration of repetition is lower.

For a user with a poor channel quality, more symbols are needed, so the possibility of cross-slot transmission is greater. For example, 14 symbols are needed, and arrival of a service is random, as long as the service does not arrive at the first symbol, a problem of cross-slot transmission will occur. For a user with a good channel quality, only fewer symbols are needed, so the possibility of cross-slot transmission will be less. For example, two symbols are needed, as long as the service does not arrive at the fourteenth symbol, a problem of cross-slot transmission will not occur.

Thus, the dynamic configuration of repetition is more suitable for the user with a poor channel quality.

An implementation of the present disclosure discloses a method for repetition transmission, which includes: reusing a predetermined indication field of Downlink Control Information (DCI) to indicate repetition information, herein the repetition information is used for indicating a terminal device to perform transmission according to the repetition information.

Preferably, reusing the predetermined indication field of the DCI may refer to reusing a time domain resource assignment and/or a Modulation and Coding Scheme (MCS).

For a user with a poor channel quality, the number of time domain symbols is usually configured to be a larger value, and a redundant field exists in the time domain resource assignment, in which the repetition information may be contained.

Preferably, ways of indicating the repetition information through reusing the time domain resource assignment may include: adding a repetition field in Physical Downlink Shared Channel-time domain resource allocation (PDSCH-TimeDomainResourceAllocation) and/or Physical Uplink Shared Channel-time domain resource allocation (PUSCH-TimeDomainResourceAllocation), herein the repetition field contains information about a number of repetitions.

For example, the repetition field may be added to the PDSCH-TimeDomainResourceAllocation as follows:

```
PDSCH-TimeDomainResourceAllocationList  ::= SEQUENCE
  (SIZE(1..maxNrofDL-Allocations))
  OF PDSCH-TimeDomainResourceAllocation
PDSCH-TimeDomainResourceAllocation ::=  SEQUENCE {
    k0                          INTEGER(0..32)
                                OPTIONAL, -- Need S
    mappingType                 ENUMERATED {typeA, typeB},
    startSymbolAndLength        INTEGER (0..127)
    AggregationFactor           ENUMERATED {n1, n2, n4, n8}
};
```

Where "AggregationFactor" is a newly added repetition field; n2, n4 and n8 respectively represents that the numbers of repetitions are 2, 4 and 8, and if the number of repetitions is 1, it represents no repetition.

The repetition field may be added to the PUSCH-TimeDomainResourceAllocation as follows:

```
PUSCH-TimeDomainResourceAllocationList ::=  SEQUENCE
  (SIZE(1..maxNrofUL-Allocations))
  OF PUSCH-TimeDomainResourceAllocation
PUSCH-TimeDomainResourceAllocation ::=  SEQUENCE {
    k2                          INTEGER(0..32)
                                OPTIONAL, -- Need S
    mappingType                 ENUMERATED {typeA, typeB},
    startSymbolAndLength        INTEGER (0..127)
    AggregationFactor           ENUMERATED {n1, n2, n4, n8}
}
```

Preferably, the ways of indicating the repetition information through reusing the time domain resource assignment may further include: adding a cross-slot configuration in the PDSCH-TimeDomainResourceAllocation and/or PUSCH-TimeDomainResourceAllocation.

For example, a configuration of a length greater than 14 symbols, such as 21, 25, 28, 32, or 35, may be added to "startSymbolAndLength".

According to combinations of different starting symbols and different lengths, 128 cases may be combined in the existing "startSymbolAndLength", all of which have certain restrictions, that is, a starting symbol plus a length will not cross a slot, while in the present disclosure cross-slot is allowed, a case (configuration) in which the length is greater than 14 belongs to cross-slot.

An essence of repetition is that more symbols are taken in time domain, thus if the number of symbols is increased, that is, if the configuration of the length greater than 14 symbols is allowed, an effect of repetition can be achieved. For example, if the number of symbols configured for no repetition is 14, then the number of symbols configured is 28, which is equivalent to a number of repetitions being 2.

The above is an explanation of how to indicate the repetition information through reusing the time domain resource assignment. As mentioned above, the repetition information may also be indicated through reusing the Modulation and Coding Scheme, that is, MCS.

For a user with a poor channel quality, MCS of which is usually configured to be a smaller value, a larger value is not needed, and a redundant field exists in the MCS, in which the repetition information may be contained.

Preferably, a way of indicating the repetition information through reusing the MCS may include: defining a new MCS table, and adding information about a number of repetitions to the new MCS table.

Defining the new MCS table may include: removing N elements in a MCS table and adding N repetition configurations, where N is a positive integer, and a number of repetitions in each of the repetition configurations is greater than one.

A specific value of N may be determined according to actual needs, such as 3. When the value of N is 3, the new MCS table defined based on Table 5.1.3.1-3: MCS index table 3 for PDSCH (38.214) may be shown in table 1 or table 2.

TABLE 1

New MCS table

| MCS Index $I_{MCS}$ | Modulation Order $Q_m$ | Target code Rate R × [1024] | Spectral efficiency | Repetition |
|---|---|---|---|---|
| 0 | 2 | 1 | 0.0073 | 2 |
| 1 | 2 | 7 | 0.0146 | 4 |
| 2 | 2 | 15 | 0.0293 | 8 |
| 3 | 2 | 30 | 0.0586 | 1 |
| 4 | 2 | 40 | 0.0781 | 1 |
| 5 | 2 | 50 | 0.0977 | 1 |
| 6 | 2 | 64 | 0.1250 | 1 |
| 7 | 2 | 78 | 0.1523 | 1 |
| 8 | 2 | 99 | 0.1934 | 1 |
| 9 | 2 | 120 | 0.2344 | 1 |
| 10 | 2 | 157 | 0.3066 | 1 |
| 11 | 2 | 193 | 0.3770 | 1 |
| 12 | 2 | 251 | 0.4902 | 1 |
| 13 | 2 | 308 | 0.6016 | 1 |
| 14 | 2 | 379 | 0.7402 | 1 |
| 15 | 2 | 449 | 0.8770 | 1 |
| 16 | 2 | 526 | 1.0273 | 1 |
| 17 | 2 | 602 | 1.1758 | 1 |
| 18 | 4 | 340 | 1.3281 | 1 |
| 19 | 4 | 378 | 1.4766 | 1 |
| 20 | 4 | 434 | 1.6953 | 1 |
| 21 | 4 | 490 | 1.9141 | 1 |
| 22 | 4 | 553 | 2.1602 | 1 |
| 23 | 4 | 616 | 2.4063 | 1 |
| 24 | 6 | 438 | 2.5664 | 1 |
| 25 | 6 | 466 | 2.7305 | 1 |
| 26 | 6 | 517 | 3.0293 | 1 |
| 27 | 6 | 567 | 3.3223 | 1 |
| 28 | 6 | 616 | 3.6094 | 1 |
| 29 | 2 | | Reserved | |
| 30 | 4 | | Reserved | |
| 31 | 6 | | Reserved | |

TABLE 2

New MCS table

| MCS Index $I_{MCS}$ | Modulation Order $Q_m$ | Target code Rate R × [1024] | Spectral efficiency | Repetition |
|---|---|---|---|---|
| 0 | 2 | 1 | 0.0073 | 2 |
| 1 | 2 | 7 | 0.0146 | 4 |
| 2 | 2 | 15 | 0.0293 | 8 |
| 3 | 2 | 30 | 0.0586 | 1 |
| 4 | 2 | 40 | 0.0781 | 1 |
| 5 | 2 | 50 | 0.0977 | 1 |
| 6 | 2 | 64 | 0.1250 | 1 |
| 7 | 2 | 78 | 0.1523 | 1 |
| 8 | 2 | 99 | 0.1934 | 1 |
| 9 | 2 | 120 | 0.2344 | 1 |
| 10 | 2 | 157 | 0.3066 | 1 |
| 11 | 2 | 193 | 0.3770 | 1 |
| 12 | 2 | 251 | 0.4902 | 1 |
| 13 | 2 | 308 | 0.6016 | 1 |
| 14 | 2 | 379 | 0.7402 | 1 |
| 15 | 2 | 449 | 0.8770 | 1 |
| 16 | 2 | 526 | 1.0273 | 1 |
| 17 | 4 | 340 | 1.3281 | 1 |
| 18 | 4 | 378 | 1.4766 | 1 |
| 19 | 4 | 434 | 1.6953 | 1 |
| 20 | 4 | 490 | 1.9141 | 1 |
| 21 | 4 | 553 | 2.1602 | 1 |
| 22 | 6 | 438 | 2.5664 | 1 |
| 23 | 6 | 466 | 2.7305 | 1 |
| 24 | 6 | 517 | 3.0293 | 1 |
| 25 | 6 | 567 | 3.3223 | 1 |
| 26 | 6 | 616 | 3.6094 | 1 |
| 27 | 6 | 666 | 3.9023 | 1 |
| 28 | 6 | 719 | 4.2129 | 1 |
| 29 | 2 | | Reserved | |
| 30 | 4 | | Reserved | |
| 31 | 6 | | Reserved | |

In the Table 1, the last three elements in the MCS table are removed, and three repetition configurations are added, and a number of repetitions in each of the repetition configurations is greater than one. For a user with a poor channel quality, that is, a user with a low signal-to-noise ratio, MCSs for a high signal-to-noise ratio will not be used usually, which may be removed, that is, the last three elements in the MCS table may be removed, and three repetition configurations (the first three rows in the table) are added, in which the numbers of repetitions are 2, 4 and 8, respectively.

In the Table 2, three elements are removed from the MCS table similarly, but compared with the Table 1, instead of removing the last three elements, the last element of each modulation mode (the second column in the table) is removed, and three repetition configurations are added, in which the numbers of repetitions are 2, 4 and 8, respectively.

Preferably, the way of indicating the repetition information through reusing the MCS may further include: splitting indication bits of the MCS into two parts, one part is used for indicating the repetition information, and the other part is used for indicating the MCS.

An existing MSC indication bits are 5 bits, which may indicate 32 cases in total. In the present disclosure, these 5 bits are split into two parts, such as 2 bits and 3 bits, in which 2 bits are used for indicating the repetition information, and the remaining 3 bits are used for indicating the MCS.

As only 3 bits are used for indicating the MCS, only 8 cases can be indicated. Elements in the corresponding MCS table may be predetermined by a protocol, and elements in the MCS table may be selected from an existing MCS table, and elements with equivalent code rate acquired by repetition are discarded, as shown in the following table.

TABLE 3

MCS table corresponding to indication of 3 bits

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 449 | 0.8770 |
| 4 | 2 | 602 | 1.1758 |
| 5 | 4 | 340 | 1.3281 |
| 6 | 4 | 490 | 1.9141 |
| 7 | 6 | 772 | 4.5234 |

The elements in the MSC table may be configurable in addition to be predetermined by the protocol, for example, the MSC table may be configured by a Radio Resource Control (RRC) signaling, and all the elements in the MSC table may be selected from the existing MCS table.

In addition, in the solution described in the present disclosure, a repetition mode may also be configured in an explicit or implicit manner, and the repetition mode at least contains a dynamic configuration mode.

Herein, the explicit manner may include: configuring with an added RRC signaling, as shown below:

```
PDSCH-Config ::=        SEQUENCE {
......
pdsch-AggregationMode   ENUMERATED {dynamic, semi-static}
                        OPTIONAL,
......};
PUSCH-Config ::=        SEQUENCE {
......
pusch-AggregationMode   ENUMERATED {dynamic, semi-static}
                        OPTIONAL,
......};
```

Herein, "dynamic" represents a dynamic configuration mode and "semi-static" represents a semi-static configuration mode. When it is the dynamic configuration mode, dynamic repetition indication may be performed subsequently in a way of adding the repetition information in the predetermined indication field of DCI.

The implicit manner may include: containing repetition information in PDSCH-TimeDomainResourceAllocation and/or PUSCH-TimeDomainResourceAllocation, as shown below:

```
PDSCH-TimeDomainResourceAllocationList ::= SEQUENCE
(SIZE(1..maxNrofDL-Allocations))
OF PDSCH-TimeDomainResourceAllocation
PDSCH-TimeDomainResourceAllocation ::=  SEQUENCE {
   k0                   INTEGER(0..32)   OPTIONAL, -- Need S
   mappingType          ENUMERATED {typeA, typeB},
   startSymbolAndLength INTEGER (0..127)
   AggregationFactor    ENUMERATED { n1, n2, n4, n8}
};
PUSCH-TimeDomainResourceAllocationList ::=  SEQUENCE
(SIZE(1..maxNrofUL-Allocations))
OF PUSCH-TimeDomainResourceAllocation
PUSCH-TimeDomainResourceAllocation ::=  SEQUENCE {
   k2                   INTEGER(0..32)   OPTIONAL, -- Need S
   mappingType          ENUMERATED {typeA, typeB},
   startSymbolAndLength INTEGER (0..127)
AggregationFactor       ENUMERATED {n1, n2, n4, n8}
}
```

The implicit manner may also include: configuring the MCS table as an MCS table containing the number of repetitions, as shown below:

```
PDSCH-Config ::=    SEQUENCE {
......
   mcs-Table    ENUMERATED {MCSRep}   OPTIONAL, -- Need S
   ......
};
PUSCH-Config ::=    SEQUENCE {
......
   mcs-Table    ENUMERATED {MCSRep}   OPTIONAL, -- Need S
......
}
```

The above-mentioned reusing the predetermined indication field of the downlink control information to indicate the repetition information and configuring the repetition mode in an explicit or implicit manner, etc., are all operations performed by a network side.

For a terminal device side, the terminal device may acquire the repetition information, which is the information indicated through reusing the predetermined indication field of the downlink control information by the network side, and may perform transmission according to the repetition information.

As mentioned above, the predetermined indication domain may include a time domain resource assignment and/or a Modulation and Coding Scheme.

The terminal device may further acquire a repetition mode configured by the network side in an explicit or implicit manner, and the repetition mode at least contains a dynamic configuration mode. If the configured repetition mode is the dynamic configuration mode, the dynamic repetition may be initiated, that is, the dynamic repetition transmission may be performed according to the repetition information.

Figure 2:
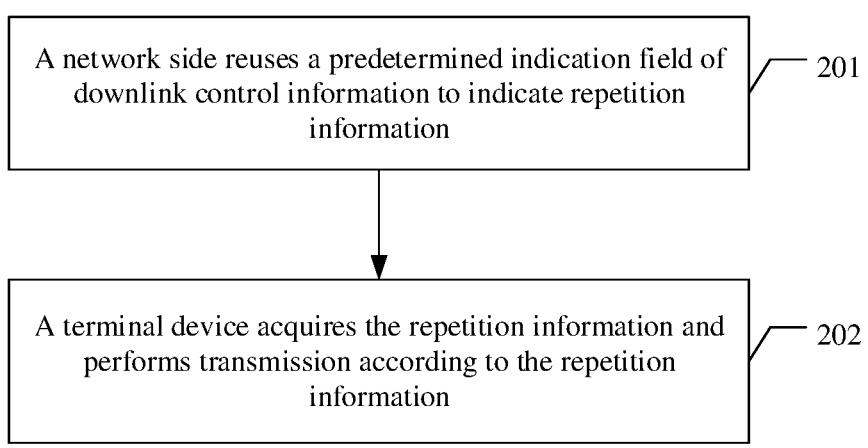
FIG. 2 is a schematic flow chart of a method for repetition transmission according to an implementation of the present disclosure.

To summarize the above description, FIG. 2 is a schematic flow chart of a method for repetition transmission according to an implementation of the present disclosure. As shown in FIG. 2, the method includes a specific implementation as follows, which includes acts 201 and 202.

In 201, a network side reuses a predetermined indication field of downlink control information to indicate repetition information.

In 202, a terminal device acquires the repetition information and performs transmission according to the repetition information.

It should be noted that for the sake of brief description, the aforementioned method implementations are expressed as combinations of a series of actions, but a person skilled in the art should know that the present disclosure is not limited by the described sequence of actions, as some acts may be performed in other sequences or simultaneously according to the present disclosure. Secondly, a person skilled in the art should also know that the implementations described in the specification all belong to preferred implementations, in which the actions and the modules involved are not necessarily essential to the present disclosure.

In the above-described implementations, the description of each implementation has its own emphasis, and for a part which is not described in detail in a certain implementation, related descriptions in other implementations may be referred to.

In a word, by adopting the solution described in the present disclosure, the predetermined indication field of the downlink control information may be reused to indicate the repetition information, so that the terminal device can perform transmission according to the repetition information, thus a dynamic indication of the repetition information is achieved to better meet the service requirements. Moreover, a backward compatibility is considered and a length of a downlink control information format does not need to be modified.

The above is the description of method implementations, and the solution of the present disclosure will be further described below through apparatus implementations.

Figure 3:
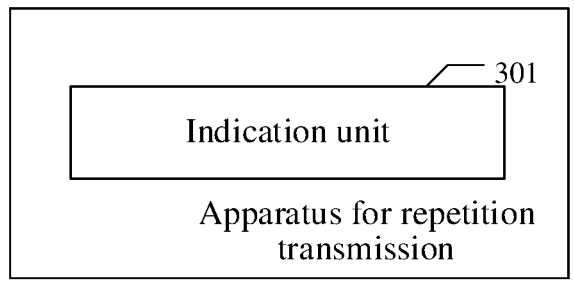
FIG. 3 is a first schematic diagram of a structure of an apparatus for repetition transmission according to an implementation of the present disclosure.

FIG. 3 is a first schematic diagram of a structure of an apparatus for repetition transmission according to an implementation of the present disclosure. As shown in FIG. 3, the apparatus includes an indication unit 301.

The indication unit 301 is configured to reuse a predetermined indication field of downlink control information to indicate repetition information, wherein the repetition information is used for indicating a terminal device to perform transmission according to the repetition information.

Preferably, the predetermined indication field may include: a time domain resource assignment.

Accordingly, the indication unit 301 may add a repetition field in PDSCH-TimeDomainResourceAllocation and/or PUSCH-TimeDomainResourceAllocation, and the repetition field contains information about a number of repetitions.

Or, the indication unit 301 may add a cross-slot configuration in PDSCH-TimeDomainResourceAllocation and/or PUSCH-TimeDomainResourceAllocation, for example, by adding a configuration of a length greater than 14 symbols, for example, a configuration containing a starting symbol and a length, and resources determined based on the starting symbol and the length cross a slot.

Preferably, the predetermined indication field may further include a Modulation and Coding Scheme.

Accordingly, the indication unit 301 may define a new MCS table, and information about a number of repetitions is added to the new MCS table.

In the new MCS table, N elements may be removed, and N repetition configurations may be added, where N is a positive integer, and the number of repetition in each of the repetition configurations is greater than one. For example, in the MCS table, last three elements may be removed and three repetition configurations may be added, in which the numbers of repetitions are 2, 4 and 8, respectively.

Or, the indication unit 301 may split indication bits of the Modulation and Coding Scheme into two parts, in which one part is used for indicating the repetition information, and the other part is used for indicating the Modulation and Coding Scheme.

The existing MSC indication bits are 5 bits, which may indicate 32 cases in total. In the present disclosure, these 5 bits are split into two parts, such as 2 bits and 3 bits, wherein 2 bits are used for indicating the repetition information, and the remaining 3 bits are used for indicating the MCS.

As only 3 bits are used for indicating the MCS, only 8 cases can be indicated. Elements in the corresponding MCS table may be predetermined by a protocol, and the elements in the MCS table may be selected from the existing MCS table, and elements with equivalent code rate acquired by repetition are discarded.

The elements in the MSC table may be configurable in addition to be predetermined by the protocol, for example, the MSC table may be configured by an RRC signaling, and all the elements in the MSC table may be selected from the existing MCS table.

In addition, the indication unit 301 may also configure a repetition mode in an explicit or implicit manner, and the repetition mode at least contains a dynamic configuration mode.

Herein, the explicit manner may include: configuring with an added RRC signaling.

The implicit manner may include: containing repetition information in PDSCH-TimeDomainResourceAllocation and/or PUSCH-TimeDomainResourceAllocation, and/or configuring the MCS table as an MCS table containing a number of repetitions.

Figure 4:
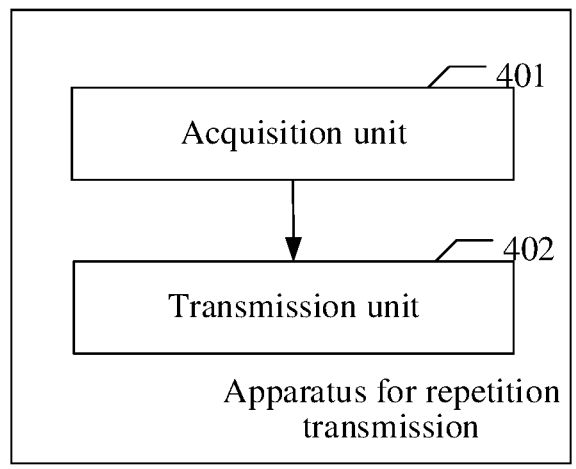
FIG. 4 is a second schematic diagram of a structure of an apparatus for repetition transmission according to an implementation of the present disclosure.

FIG. 4 is a second schematic diagram of a structure of an apparatus for repetition transmission according to an implementation of the present disclosure. As shown in FIG. 4, the apparatus includes an acquisition unit 401 and a transmission unit 402.

The acquisition unit 401 is configured to acquire repetition information, herein the repetition information is information indicated through reusing a predetermined indication field of downlink control information by a network side.

The transmission unit 402 is configured to perform transmission according to the repetition information.

Preferably, the predetermined indication domain may include a time domain resource assignment and/or a Modulation and Coding Scheme.

The acquisition unit 401 may further acquire a repetition mode configured by the network side in an explicit or implicit manner, wherein the repetition mode at least contains a dynamic configuration mode.

For a specific working flow of the apparatus implementations shown in FIG. 3 and FIG. 4, reference may be made to relevant description in the aforementioned method implementations, which will not be repeated.

Figure 5:
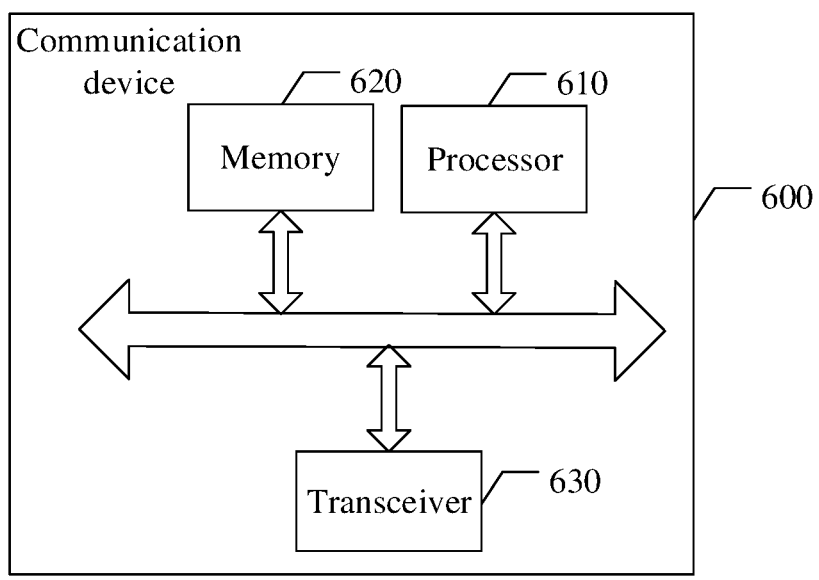
FIG. 5 is a schematic diagram of a communication device 600 of a structure of an implementation of the present disclosure.

FIG. 5 is a schematic diagram of a structure of a communication device 600 according to an implementation of the present disclosure. The communication device 600 shown in FIG. 5 includes a processor 610. The processor 610 may call a computer program from a memory 620 and run the computer program, to implement the methods in the implementations of the present disclosure.

Optionally, as shown in FIG. 5, the communication device 600 may further include a memory 620. The processor 610 may call and run a computer program from the memory 620 to implement the methods in the implementations of the present disclosure.

The memory 620 may be a separate device independent of the processor 610 or may be integrated in the processor 610.

Optionally, as shown in FIG. 5, the communication device 600 may further include a transceiver 630, and the processor 610 may control the transceiver 630 to communicate with other devices. Specifically, the transceiver 830 may send information or data to other devices or receive information or data sent by other devices.

The transceiver 630 may include a transmitter and a receiver. The transceiver 630 may further include an antenna, and a number of antennas may be one or more.

Optionally, the communication device 600 may be the network device of the implementations of the present disclosure, and the communication device 600 may implement the corresponding processes implemented by the network device in various methods of the implementations of the present disclosure, which will not be repeated herein for brevity.

Optionally, the communication device 600 may be specifically a mobile terminal/terminal device of the implementations of the present disclosure, and the communication device 600 may implement the corresponding processes implemented by the mobile terminal/terminal device in the various methods of the implementations of the present disclosure, which will not be repeated herein for brevity.

Figure 6:
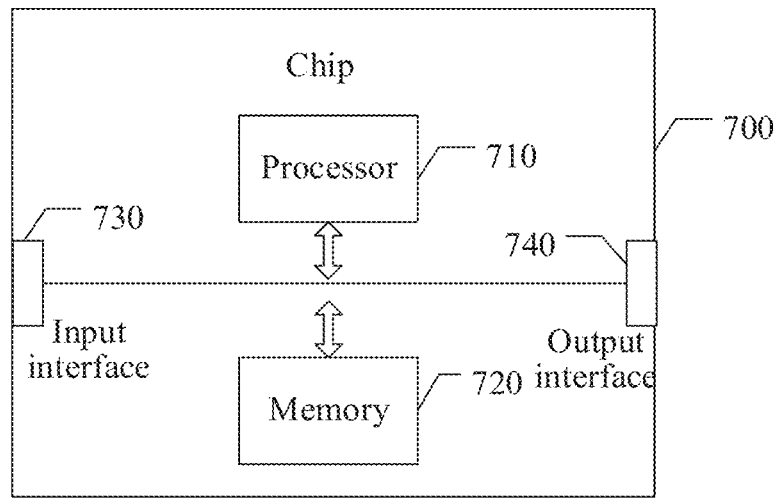
FIG. 6 is a schematic diagram of a chip 700 of a structure of an implementation of the present disclosure.

FIG. 6 is a schematic diagram of a structure of a chip 700 according to an implementation of the present disclosure. A chip 700 shown in FIG. 6 includes a processor 710. The processor 710 may call and run a computer program from a memory to implement the methods in the implementations of the present disclosure.

Optionally, as shown in FIG. 6, the chip 700 may further include a memory 720. The processor 710 may call and run a computer program from the memory 720 to implement the methods in the implementations of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 710 may acquire information or data sent by other device or chip.

Optionally, the chip 700 may further include an output interface 740. The processor 710 may control the output interface 740 to communicate with other devices or chips. Specifically, the processor 910 may output information or data to other device or chip.

Optionally, the chip may be applied in the network device of the implementations of the present disclosure, and the chip may implement the corresponding processes implemented by the network device in various methods of the implementations of the present disclosure, which will not be repeated herein for brevity.

Optionally, the chip may be applied in a mobile terminal/terminal device of the implementations of the present disclosure, and the chip may implement the corresponding processes implemented by the mobile terminal/terminal device in the various methods of the implementations of the present disclosure, which will not be repeated herein for brevity.

It should be understood that the chip mentioned in the implementation of the present disclosure may be referred to as a system-level chip, a system chip, a chip system or a system-on-chip, etc.

Figure 7:
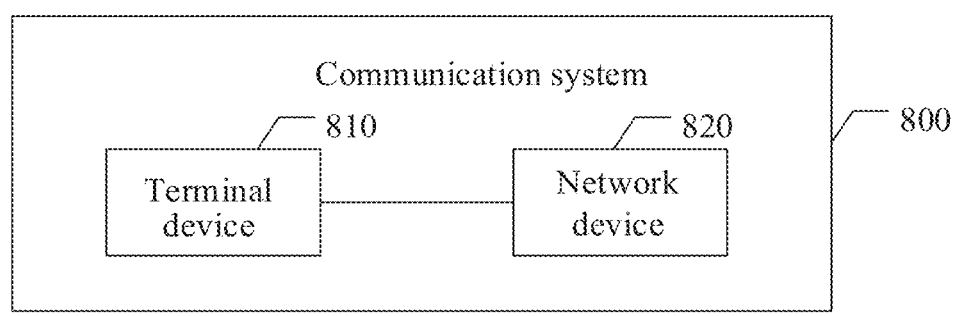
FIG. 7 is a schematic block diagram of a communication system 800 of a structure of an implementation of the present disclosure.

FIG. 7 is a schematic block diagram of a communication system 800 according to an implementation of the present disclosure. As shown in FIG. 7, the communication system 800 may include a terminal device 810 and a network device 820.

Herein, the terminal device 810 may be configured to implement the corresponding functions implemented by the terminal device in the above-mentioned methods, and the network device 820 may be configured to implement the corresponding functions implemented by the network device in the above-mentioned methods, which will not be repeated here for brevity.

It should be understood that, the processor in the implementations of the present disclosure may be an integrated circuit chip having a signal processing capability. In an implementation process, the acts of the foregoing method implementations may be implemented by using an integrated logic circuit of hardware in the processor or instructions in a form of software. The above processor may be a general purpose processor, a Digital Signal Processor (DSP), an Application Specific Integrated Circuit (ASIC), a Field Programmable Gate Array (FPGA) or other programmable logic device, a discrete gate or a transistor logic device, or a discrete hardware component. The processor may implement or perform methods, acts and logical block diagrams disclosed in the implementations of the present disclosure. The general purpose processor may be a microprocessor, or the processor may be any conventional processor or the like. The acts of the methods disclosed with reference to the implementations of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and performs the acts of the above methods in combination with its hardware.

It may be understood that, the memory in the implementations of the present disclosure may be a volatile memory or a non-volatile memory, or may include both a volatile memory and a non-volatile memory. Herein, the non-transitory memory may be a Read-Only Memory (ROM), a Programmable ROM (PROM), an Erasable PROM (EPROM), an Electrically EPROM (EEPROM), or a flash memory. The volatile memory may be a Random Access Memory (RAM) which serves as an external cache. Through illustrative but not limitative description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories in the systems and methods described in the document are intended to include, but are not limited to, these and any other suitable types of memories.

An implementation of the present disclosure further provides a computer-readable storage medium configured to store a computer program.

Optionally, the computer-readable storage medium may be applied in the network device of the implementations of the present disclosure, and when the computer program is run on a computer, the computer is enabled to perform the corresponding processes implemented by the network device in various methods of the implementations of the present disclosure, which will not be repeated herein for brevity.

Optionally, the computer-readable storage medium may be applied in a mobile terminal/terminal device of the implementations of the present disclosure, and when the computer program is run on a computer, the computer is enabled to perform the corresponding processes implemented by the mobile terminal/terminal device in various methods of the implementations of the present disclosure, which will not be repeated herein for brevity.

An implementation of the present disclosure further provides a computer program product including computer program instructions.

Optionally, the computer program product may be applied in the network device of the implementations of the present disclosure, and when the computer program instructions are executed by a computer, the computer is enabled to perform the corresponding processes implemented by the network device in various methods of the implementations of the present disclosure, which will not be repeated herein for brevity.

Optionally, the computer program product may be applied in a mobile terminal/terminal device of the implementations of the present disclosure, and when the computer program instructions are executed by a computer, the computer is enabled to perform the corresponding processes implemented by the mobile terminal/terminal device in various methods of the implementations of the present disclosure, which will not be repeated herein for brevity.

An implementation of the present disclosure also provides a computer program.

Optionally, the computer program may be applied in the network device of the implementations of the present disclosure. When the computer program is run on the computer, the computer is enabled to perform the corresponding processes implemented by the network device in various methods of the implementations of the present disclosure, which will not be repeated herein for brevity.

Optionally, the computer program may be applied in a mobile terminal/terminal device of the implementation of the present disclosure. When the computer program is run on the computer, the computer is enabled to perform the corresponding processes implemented by the mobile terminal/terminal device in various methods of the implementations of the present disclosure, which will not be repeated herein for brevity.

Those of ordinary skill in the art will recognize that the example elements and algorithm acts described in combination with the implementations disclosed herein may be implemented in electronic hardware, or a combination of computer software and electronic hardware. Whether these functions are implemented in hardware or software depends on a specific application and design constraints of the technical solution. A skilled person may use different methods to implement the described functions in respect to each particular application, but such implementation should not be considered to be beyond the scope of the present disclosure.

Those skilled in the art may clearly understand that for convenience and conciseness of description, specific working processes of the systems, apparatuses and units described above may refer to the corresponding processes in the method implementations and will not be described herein.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division modes in actual implementation, for example, multiple units or components may be combined or integrated into another system, or some features may be ignored or not executed. On the other hand, the displayed or discussed mutual coupling or direct coupling or communication connection shown or discussed may be indirect coupling or communication connection through some interface, apparatus or unit. The indirect couplings or communication connections between apparatuses or units may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

When the functions are implemented in the form of software functional units and sold or used as an independent product, the software functional units may be stored in a computer-readable storage medium. Based on such understanding, the technical solution of the present disclosure, in essence, or the part contributing to the prior art, or the part of the technical solution, may be embodied in the form of a software product stored in a storage medium. The computer software product is stored in a storage medium and includes several instructions for instructing a computer device (which may be a personal computer, a server, or a network device and the like) to perform all or part of the acts of the method described in various implementations of the present disclosure. The storage medium includes any medium that can store program codes, such as a USB flash disk, a removable hard disk, a ROM, a RAM, a magnetic disk, or an optical disk.

The foregoing descriptions are merely specific implementations of the present disclosure, but the protection scope of the present disclosure is not limited thereto. Any variation or substitution that may be readily conceived by a person skilled in the art within the technical scope disclosed by the present disclosure shall fall within the protection scope of the present disclosure. Therefore, the protection scope of the present disclosure shall be subjected to the protection scope of the claims.

What we claim is:

1. A method for indicating transmission repetitions, comprising: reusing a time domain resource assignment indication field of downlink control information to indicate repetition information to a terminal device by transmitting the repetition information to the terminal device through a repetition field in Physical Downlink Shared Channel-time domain resource allocation (PDSCH-TimeDomainResourceAllocation) and/or Physical Uplink Shared Channel-time domain resource allocation (PUSCH-TimeDomainResourceAllocation); wherein the repetition field is added to the PDSCH-TimeDomainResourceAllocation and/or PUSCH-TimeDomainResourceAllocation for indicating the repetition information; wherein the repetition information comprises information about a number of repetitions that indicates the terminal device to perform transmission; wherein PDSCH-TimeDomainResourceAllocation is an element of PUSCH-TimeDomainResourceAllocationList, which is an information element (IE) of PUSCH-Config. and PUSCH-TimeDomainResourceAllocation is an element of PDSCH-TimeDomainResourceAllocationList, which is an IE of PUSCH-Config.

2. The method of claim 1, wherein the PDSCH-TimeDomainResourceAllocation and/or the PUSCH-TimeDomainResourceAllocation comprises a cross-slot configuration.

3. The method of claim 2, wherein the cross-slot configuration is a configuration of a length greater than 14 symbols in a start symbol and length (startSymbolAndLength) field in the PDSCH-TimeDomainResourceAllocation and/or the PUSCH-TimeDomainResourceAllocation.

4. The method of claim 1, wherein the repetition field is a new field added in the PDSCH-TimeDomainResourceAllocation and/or PUSCH-TimeDomainResourceAllocation.

5. A method for indicating transmission repetition, comprising: acquiring, by a terminal device, in case of a time domain resource assignment indication field of downlink control information being reused to indicate repetition information, the repetition information from a repetition field in Physical Downlink Shared Channel-time domain resource allocation (PDSCH-TimeDomainResourceAllocation) and/or Physical Uplink Shared Channel-time domain resource allocation (PUSCH-TimeDomainResourceAllocation); wherein the repetition information comprises information about a number of repetitions that indicates the terminal device to perform transmission; wherein the repetition field is added to the PDSCH-TimeDomainResourceAllocation and/or PUSCH-TimeDomainResourceAllocation for indicating the repetition information; and performing, by the terminal device, transmission according to the repetition information; wherein PDSCH-TimeDomainResourceAllocation is an element of PUSCH-TimeDomainResourceAllocationList, which is an information element (IE) of PUSCH-Config. and PUSCH-TimeDomainResourceAllocation is an element of PDSCH-TimeDomainResourceAllocationList, which is an IE of PUSCH-Config.

6. The method of claim 5, further comprising:
  acquiring, by the terminal, a cross-slot configuration in the PDSCH-TimeDomainResourceAllocation and/or the PUSCH-TimeDomainResourceAllocation.

7. The method of claim 6, wherein
  acquiring, by the terminal, the cross-slot configuration in the PDSCH-TimeDomainResourceAllocation and/or the PUSCH-TimeDomainResourceAllocation, comprises:
  acquiring, by the terminal, a configuration of a length greater than 14 symbols from a start symbol and length (startSymbolAndLength) field in the PDSCH-TimeDomainResourceAllocation and/or the PUSCH-TimeDomainResourceAllocation.

8. The method of claim 5, wherein the repetition field is a new field added in the PDSCH-TimeDomainResourceAllocation and/or PUSCH-TimeDomainResourceAllocation.

9. An apparatus for indicating transmission repetition, comprising a processor and a transceiver; wherein the transceiver is configured to reuse a time domain resource assignment indication field of downlink control information to indicate repetition information to a terminal device by transmitting the repetition information to the terminal device through a repetition field in Physical Downlink Shared Channel-time domain resource allocation (PDSCH-TimeDomainResourceAllocation) and/or Physical Uplink Shared Channel-time domain resource allocation (PUSCH-TimeDomainResourceAllocation); wherein the repetition field is added to the PDSCH-TimeDomainResourceAllocation and/or PUSCH-TimeDomainResourceAllocation for indicating the repetition information; wherein the repetition information comprises information about a number of repetitions that indicates the terminal device to perform transmission; wherein PDSCH-TimeDomainResourceAllocation is an element of PUSCH-TimeDomainResourceAllocationList, which is an information element (IE) of PUSCH-Config. and PUSCH-TimeDomainResourceAllocation is an element of PDSCH-TimeDomainResourceAllocationList, which is an IE of PUSCH-Config.

10. The apparatus of claim 9, wherein the PDSCH-TimeDomainResourceAllocation and/or the PUSCH-TimeDomainResourceAllocation comprises a cross-slot configuration.

11. The apparatus of claim 10, wherein the cross-slot configuration is a configuration of a length greater than 14 symbols in a start symbol and length (startSymbolAndLength) field in the PDSCH-TimeDomainResourceAllocation and/or the PUSCH-TimeDomainResourceAllocation.

12. The apparatus of claim 9, wherein the repetition field is a new field added in the PDSCH-TimeDomainResourceAllocation and/or PUSCH-TimeDomainResourceAllocation.

13. An apparatus for indicating transmission repetition, comprising: a processor and a transceiver; wherein the processor is configured to: in case of a time domain resource assignment indication field of downlink control information being reused to indicate repetition information, acquire the repetition information from a repetition field in Physical Downlink Shared Channel-time domain resource allocation (PDSCH-TimeDomainResourceAllocation) and/or Physical Uplink Shared Channel-time domain resource allocation (PUSCH-TimeDomainResourceAllocation); wherein the repetition information comprises information about a number of repetitions that indicates the terminal device to perform transmission; wherein the repetition field is added to the PDSCH-TimeDomainResourceAllocation and/or PUSCH-TimeDomainResourceAllocation for indicating the repetition information; and the transceiver is configured to perform transmission according to the repetition information; wherein PDSCH-TimeDomainResourceAllocation is an element of PUSCH-TimeDomainResourceAllocationList, which is an information element (IE) of PUSCH-Config. and PUSCH-TimeDomainResourceAllocation is an element of PDSCH-TimeDomainResourceAllocationList, which is an IE of PUSCH-Config.

14. The method of claim 13, wherein the processor is further configured to:
acquire a cross-slot configuration in the PDSCH-TimeDomainResourceAllocation and/or the PUSCH-TimeDomainResourceAllocation.

15. The method of claim 14, wherein the processor is configured to:
acquire a configuration of a length greater than 14 symbols from a start symbol and length (startSymbolAndLength) field in the PDSCH-TimeDomainResourceAllocation and/or the PUSCH-TimeDomainResourceAllocation.

16. The apparatus of claim 13, wherein the repetition field is a new field added in the PDSCH-TimeDomainResourceAllocation and/or PUSCH-TimeDomainResourceAllocation.

* * * * *